(12) United States Patent
Gurunathan et al.

(10) Patent No.: US 7,265,849 B2
(45) Date of Patent: Sep. 4, 2007

(54) SYSTEMS AND METHODS FOR DETERMINING THE SPECTRAL CONTENT OF AN OPTICAL SIGNAL

(75) Inventors: Mohan Gurunathan, Mountain View, CA (US); William Ian McAlexander, Redwood City, CA (US); Tun S. Tan, Los Altos Hills, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 366 days.

(21) Appl. No.: 10/670,538

(22) Filed: Sep. 25, 2003

(65) Prior Publication Data

US 2005/0068533 A1 Mar. 31, 2005

(51) Int. Cl.
*G01B 9/02* (2006.01)
(52) U.S. Cl. ..................................... 356/484
(58) Field of Classification Search .............. 356/451, 356/484; 398/208
See application file for complete search history.

(56) References Cited

U.S. PATENT DOCUMENTS 5,146,359 A 9/1992 Okoshi et al.
5,491,763 A 2/1996 van Deventer et al.

OTHER PUBLICATIONS

Baney, D., et al., "Coherent Optical Spectrum Analyzer", IEEE Photonics Technology Letters, vol. 14, No. 3, Mar. 2002, 3 pages.
M.O. van Deventer et al. "High-Dynamic-Range Heterodyne Measurement of Optical Spectra", Optics Letters, Optical Society of America, Washington, US, vol. 16, No. 9, May 1, 1991, pp. 678-680.
Baney D M et al., "Coherent Opitcal Spectrum Analyzer", IEEE Photonics Technology Letters, IEEE Inc., New York, US, vol. 14, No. 3, Mar. 2002, pp. 355-357.
European Search Report, EP 04 01 0826 dated Nov. 16, 2004.

*Primary Examiner*—Hwa (Andrew) Lee

(57) ABSTRACT

In one embodiment, a method determines the spectral content of an optical signal. Specifically, the optical signal and an optical local oscillator (LO) signal are provided to inputs of an optical hybrid (e.g., an N×N optical coupler where N is greater than two). The phase-diverse components from the optical hybrid are photodetected allowing for mixing of the optical signal and the optical local oscillator. Bandpass filtering is performed to eliminate or reduce relative intensity noise (RIN). The filtered signals are mixed with an electrical LO signal. A quadrature representation of a phase-diverse heterodyne signal is generated from signals from the mixing. The negative image and the positive image from the quadrature representation are separated. The spectral content of the optical signal is determined from the images.

18 Claims, 2 Drawing Sheets

[PRIOR ART]

SYSTEMS AND METHODS FOR DETERMINING THE SPECTRAL CONTENT OF AN OPTICAL SIGNAL

TECHNICAL FIELD

The present invention is directed to systems and methods for determining the spectral content of an optical signal.

BACKGROUND

Heterodyne detection refers to detection in which a received signal is mixed with a local oscillator signal to generate an intermediate frequency (IF) for further processing. An example of heterodyne optical spectral analysis is discussed by Baney et el. in IEEE Photonics Technology Letters 14(3) (March 2002). FIG. 1 depicts coherent optical spectrum analyzer 100 according to the discussed design. A optical signal (denoted by $E_S(t)$) to be analyzed may be provided to an input fiber of 2×2 optical coupler 101. Local oscillator 102 may provide a local oscillator signal (denoted by $E_{LO}(t)$) to the other input fiber of optical coupler 101. Optical coupler 101 superimposes the optical signals ($E_S(t)$ and $E_{LO}(t)$). The output signals from optical coupler 101 (denoted by $E_A(t)$ and $E_B(t)$, respectively) are utilized to illuminate respective photodetectors 103a and 103b (e.g., photodiodes). Amplification is performed by transresistance amplifers 104a and 104b. The output from one of transresistance amplifiers 104 is subtracted from the other transresistance amplifier 104 by combiner 105.

The heterodyne signal is given by $A(t)\cos(2\pi\Delta ft+\Delta\phi(t))$ where A is the heterodyne amplitude, $\Delta f$ is the heterodyne beat frequency, and $\Delta\phi$ is the heterodyne phase. The heterodyne amplitude (A) is related to the power of the local oscillator and the power of the optical signal. The heterodyne beat frequency ($\Delta f$) is given by the instantaneous difference in frequency between the frequency of the optical signal and the frequency of the local oscillator. Likewise, the heterodyne phase ($\Delta\phi$) is given by the instantaneous difference in phase between the phase of the optical signal and the phase of the local oscillator.

SUMMARY

Embodiments in accordance with the invention perform optical spectral analysis using heterodyne conversion of an optical signal. In accordance with the invention, the heterodyne conversion may be advantageously performed in two stages. In the first stage, a phase-diverse heterodyne conversion occurs to convert a received optical signal into phase-diverse higher frequency IF signals. The higher frequency is chosen to coincide with a low intensity-noise region of the received signal. In the second stage, an electrical heterodyne conversion occurs to convert the higher frequency IF signals into phase-diverse lower-frequency IF signals. The lower frequency is chosen to coincide with the bandwidth of the electrical processing circuitry associated with the subsequent processing structure. The spectral analysis is then performed utilizing the lower-frequency IF signals. By processing phase diverse heterodyne signals, a quadrature representation of the spectral content of the optical signal may be obtained. The negative image and the positive image associated with typical band-pass filtering may be filtered with the quadrature representation thereby improving the resolution of the spectral analysis. Moreover, because the initial mixing frequency in the spectral analysis occurs at higher frequencies where intensity noise is lower, the requirements on balancing within the optical receiver are appreciably lessened.

The foregoing has outlined rather broadly the features and technical advantages of embodiments in accordance with the present invention in order that the detailed description that follows may be better understood. Additional features and advantages will be described hereinafter which form the subject of the claims of the invention. It should be appreciated by those skilled in the art that the conception and specific embodiments disclosed may be readily utilized as a basis for modifying or designing other structures for carrying out the same purposes. It should also be realized by those skilled in the art that such equivalent constructions do not depart from the spirit and scope of the embodiments in accordance with the invention as set forth in the appended claims. The features which are believed to be characteristic of embodiments in accordance with the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of embodiments in accordance with the invention.

BRIEF DESCRIPTION OF THE DRAWINGS

For a more complete understanding of embodiments in accordance with the invention, reference is now made to the following descriptions taken in conjunction with the accompanying drawings, in which.

DETAILED DESCRIPTION

Figure 2:
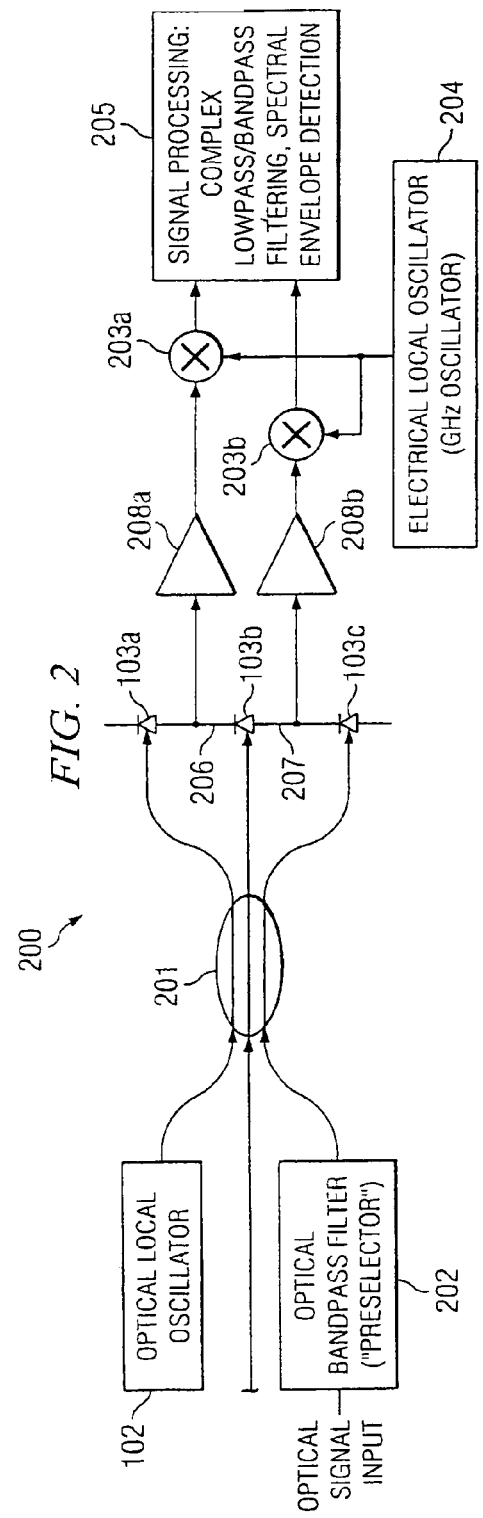
FIG. 2 depicts a system for performing optical spectral analysis using heterodyne conversion of an optical signal in embodiments in accordance with the invention.

FIG. 2 depicts system 200 for performing optical spectral analysis using heterodyne conversion of an optical signal. System 200 advantageously performs heterodyne conversion in two stages. In the first stage, a phase-diverse heterodyne conversion occurs to convert the received optical signal into phase-diverse higher frequency IF signals. The higher IF is chosen to coincide with the minimal intensity noise contribution. Specifically, the higher IF is selected such that the higher IF is beyond the beat of any two components in the signal being analyzed. By selecting the higher IF in this manner, the relative intensity noise (RIN) may be eliminated. In the second stage, an electrical heterodyne conversion occurs to convert the higher frequency IF signals into phase-diverse lower-frequency IF signals. The lower IF enables the electrical signal to be down-converted to a frequency range which coincides with processing speed of signal processing block 205. The spectral analysis is performed utilizing the phase-diverse low-frequency IF signals.

As shown in FIG. 2, the received optical signal is provided to N×N optical coupler 201 where N>2. Before provision to optical coupler 201, an optical signal may be provided to optical bandpass filter 202. Optical bandpass filter 202 may be a tunable narrowband preselector filter. The optical bandpass filter 202 functions to remove unneeded portions of the received optical signal which could contribute to RIN. Optical bandpass filter 202 may be omitted for certain applications if desired. Local oscillator 102 (e.g., a suitable tunable laser) provides a tunable local oscillator signal to another input of N×N optical coupler 201. N×N optical coupler 201 superimposes the optical fields and provides corresponding N outputs. Although N×N optical coupler 201 is shown in FIG. 2 where N>2, other suitable structures may be utilized. For example, a network of 2×2 optical couplers may be utilized to couple the local oscillator signal with the signal to be analyzed. Alternatively, other optical hybrids may be utilized to generate the desired phase diversity including free space optical elements (e.g., beam splitters).

Each output from N×N coupler 201 is utilized to illuminate a respective photodetector (shown as 103a-103c). The photodetectors 103a-103c may be implemented as photodiodes. Each photodetector 103 transforms its respective incident optical signal into a corresponding electrical signal. Furthermore, in one embodiment, photodetectors 103a-103c are arranged in a serial manner. The serial arrangement of photodetectors 103a-103c forms intermediate nodes 206 and 207. Radio frequency (RF) filters/amplifiers 208a and 208b perform bandpass filtering at a sufficiently high frequency to eliminate RIN noise. RIN noise arises from the heterodyne beating of various spectral components within the signal spectrum itself. Higher frequency RIN can be attributed to beating between components of the signal with larger frequency separation. The RIN frequency range is ultimately limited by the spectral width of the signal. The filtered signals generated by RF filters/amplifiers 208a and 208b coincide with the minimal intensity noise region associated with the signal being analyzed. This implies that the actual center-frequency of the filtering should be larger than the effective spectral width of the unknown signal. RF filters/amplifiers 208a and 208b also amplify the voltages present at nodes 206 and 207. The signals from RF filters/amplifiers 208a and 208b are higher frequency IF signals.

The signals from RF filters/amplifiers 208a and 208b are mixed with an electrical LO signal from electrical LO 204. In embodiments in accordance with the invention, RF mixers 203a and 203b may be implemented as image rejection mixers. Mixers 203a and 203b perform an electrical heterodyne conversion in which the higher frequency IF signals are down-converted into relatively lower frequency IF signals. This is advantageous, because the higher frequency components at the first stage conversion do not suffer from the intensity noise found if lower frequency components were used. In other words, the second stage heterodyne conversion enables one to map intensity noise-free heterodyne components to lower frequency signals that are compatible with signal processing block 205. Accordingly, the requirements on intensity-noise subtraction (balancing) associated with photodetectors 103 are significantly relaxed.

Signal processing block 205 may perform the spectral analysis. Signal processing block 205 may be implemented utilizing suitable analog circuitry. Alternatively, signal processing block 205 may be implemented utilizing analog-to-digital converting structures, a digital signal processor, and/ or suitable executable instructions. Signal processing block 205 may perform spectral envelope detection because the heterodyne amplitude and heterodyne phase may be determined from the phase-diverse lower frequency IF signals. Furthermore, signal processing block 205 may separate the negative image from the positive image resulting from the filters present in RF filters/amplifiers 208. By isolating the images during the sweep over the appropriate spectrum, the resolution of the spectral analysis may be increased.

Figure 1:
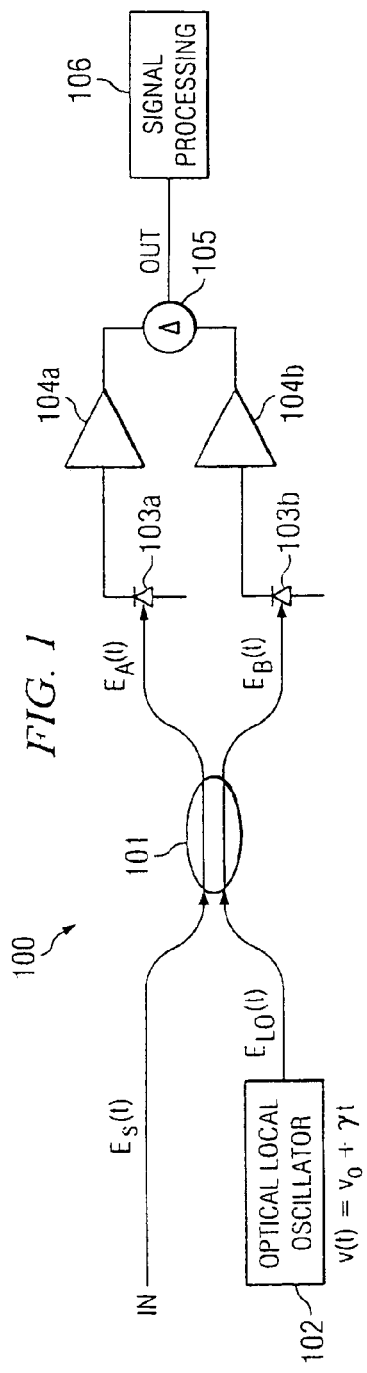
FIG. 1 depicts a coherent optical spectrum analyzer according to known designs.

Prior art (FIG. 1) uses a scalar measurement of the heterodyne signal. As previously discussed, a heterodyne signal is given by: $A(t)\cos(2\pi\Delta ft+\Delta\phi(t))$. A single, scalar measurement of the heterodyne signal cannot resolve the heterodyne amplitude ($A(t)$), because there are two unknowns (i.e., the heterodyne amplitude, $A(t)$, and the heterodyne phase, $\Delta\phi(t)$). Even if $A(t)$ is known or assumed to be constant in time, the heterodyne phase ($\Delta\phi(t)$) cannot be determined with complete certainty, because the arc-cosine function is not single valued. Therefore, from a single measurement of the heterodyne signal, it is not possible to know with certainty the relative phase ($\Delta\phi(t)$) nor whether the frequency difference ($\Delta f$) is positive or negative. Furthermore, variations in the amplitude of the heterodyne signal makes the determination of the phase argument more problematic.

Figure 4:
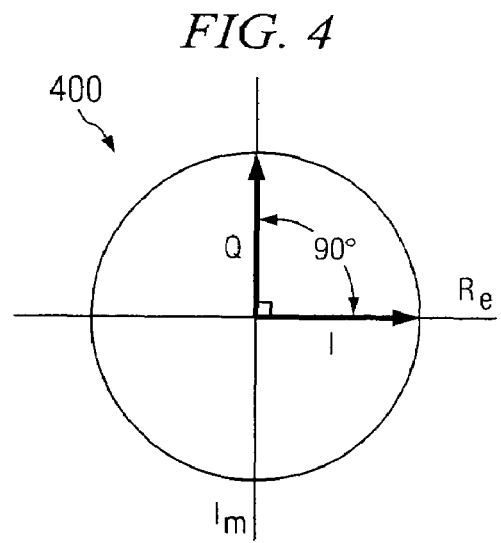
FIG. 4 depicts a complex plane representation of a heterodyne signal.

Embodiments in accordance with the invention overcome these difficulties by enabling two independent and simultaneous measurements of the heterodyne signal to obtain the two unknowns (the heterodyne amplitude ($A(t)$) and the heterodyne phase ($\Delta\phi(t)$). Specifically, embodiments in accordance with the invention represent the heterodyne signal as a vector quantity of the form: $A(t)e^{i(2\pi\Delta ft+\Delta\phi(t))}$. The phase argument ($2\pi\Delta ft+\Delta\phi(t)$) of the heterodyne signal can be computed without ambiguity by: $\arctan\{Im\{H(t)\}/Re\{H(t)\}\}$, where $H(t)$ represents the vector heterodyne signal. Thus, the real and imaginary components of the heterodyne signal constitute the components to be simultaneously measured. The unambiguous nature of this phase computation can be understood by drawing $H(t)$ as a vector in the complex plane as shown in FIG. 4. The in-phase component (the "I" component) and the quadrature component (the "Q" component) non-trivially span the real and imaginary axes of the vector space 400.

There are three main benefits to the vector representation of the heterodyne signal over the scalar representation. First, it becomes clear whether the heterodyne frequency ($\Delta f$) is positive or negative. Secondly, the relative phase ($\Delta\phi(t)$) can be determined without ambiguity. Finally, the phase measurement is now completely decoupled from variations in the heterodyne amplitude ($A(t)$) and, similarly, the measurements of the heterodyne amplitude ($A(t)$) are independent of variations in the relative phase ($\Delta\phi(t)$). Thus, any system or method that generates or otherwise processes a heterodyne signal utilizing multiple signal components that non-trivially span the real and imaginary axes is said to generate or process phase diverse signal components.

Figure 3A:
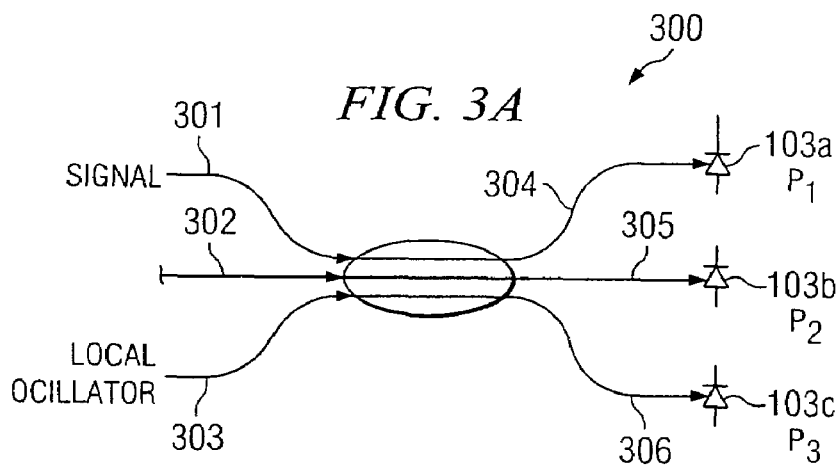
FIG. 3A depicts a 3×3 optical coupler to facilitate discussion of the performance of spectral analysis by embodiments in accordance with the invention.

FIG. 3A depicts 3×3 optical coupler 300 to facilitate discussion of the construction of a quadrature representation of the heterodyne signal. Specifically, a complex signal S may be represented as: $I+iQ$, where I is the in-phase component and Q is the quadrature component. The quadrature signal (S) is related to the heterodyne signal as follows: $S=(\text{Amplitude})e^{i(2\pi\Delta ft+\Delta\phi)} \propto (P_{LO}P_{unknown})^{1/2}e^{i(2\pi\Delta ft+\Delta\phi)}$, where $P_{LO}$ is the power of the local oscillator and $P_{unknown}$ is the power of the signal being analyzed. The complex signal S, by construction, has a determined amplitude and phase. The amplitude is related to the unknown signal power ($P_{unknown}$) thereby enabling the unknown signal power to be accurately measured independent of the value of the phase of the quadrature signal.

To construct the quadrature signal, optical coupler 300 as shown in FIG. 3A includes three inputs (denoted by 301-303). Input 301 receives the optical signal to be analyzed. Input 303 receives the local oscillator signal. Signals $E_1$ through $E_3$ from outputs 304-306 of 3×3 optical coupler 300 are utilized to illuminate respective photodetectors 103a-103c. The resulting photocurrents are labeled $P_1$ through $P_3$. Assuming that 3×3 optical coupler 300 is an ideal-coupler, signals $E_1$ through $E_3$ and $P_1$ through $P_3$ are given by equations (1) and (2):

$$\begin{bmatrix} E_1 \\ E_2 \\ E_3 \end{bmatrix} = 1/\sqrt{3} \begin{bmatrix} 1 & e^{i\pi/3} & e^{-i2\pi/3} \\ e^{i\pi/3} & 1 & e^{i\pi/3} \\ e^{-i2\pi/3} & e^{i\pi/3} & 1 \end{bmatrix} \begin{bmatrix} E_S e^{i(w_S t + \theta_S)} \\ 0 \\ E_{LO} e^{i(w_{LO} t + \theta_{LO})} \end{bmatrix} ; \text{ and} \quad (1)$$

$$\begin{bmatrix} P_1 \\ P_2 \\ P_3 \end{bmatrix} = \begin{bmatrix} R E_1^* E_1 \\ R E_2^* E_2 \\ R E_3^* E_3 \end{bmatrix}, \quad (2)$$

where R is the response characteristic of photodetectors 103.

By providing phase diversity (having multiple signal components that non-trivially span the real and imaginary axes) and by utilizing $P_2$ as a common mode channel, the three heterodyne signals $P_1$ through $P_3$ may be transformed into a quadrature representation. For example, combining block 350 of FIG. 3B may generate the I-channel from ($P_1 - P_3$) and the Q-channel from $(1/\sqrt{3})(P_1 - 2P_2 + P_3)$. The resulting quadrature signal (S=I+iQ) is a c signal that contains both amplitude and phase information. This construction of the quadrature signal is adapted according to the signal processing shown in FIGS. 3A and 3B using a 3×3 optical couplers. Quadrature representations may be generated utilizing similar techniques for other phase diverse configurations by those skilled in the art.

By constructing the quadrature representation of the heterodyne signal, it is clear whether the heterodyne frequency ($\Delta f$) is positive or negative. Secondly, the relative phase ($\Delta\phi(t)$) can be determined without ambiguity. Finally, the phase measurement is now completely decoupled from variations in the heterodyne amplitude (A(t)) and, similarly, the measurements of the heterodyne amplitude (A(t)) are independent of variations in the relative phase ($\Delta\phi(t)$). Because the measurement of the amplitude is independent, embodiments in accordance with the invention exhibit greater amplitude repeatability. Specifically, variations in the relative phase from analysis to analysis do not affect the resulting amplitude measurements. Moreover, after obtaining the quadrature representation, the quadrature signal may be subjected to complex filtering to separate the negative image from the positive image. For example, processing block 205 may include an appropriate complex filter to separate the negative image from the positive image. Specifically, the complex filter may be constructed by utilizing a suitably windowed complex impulse response based on $e^{-2\pi\Delta f t}$ or $e^{+2\pi\Delta f t}$ to isolate either the negative image or the positive image.

Figure 3B:
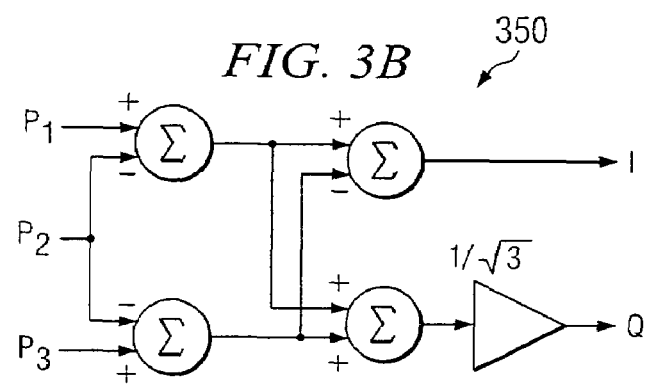
FIG. 3B depicts combining structure for generating a quadrature signal from the 3×3 optical coupler shown in FIG. 3A to facilitate the performance of spectral analysis by embodiments in accordance with the invention.

The arrangement in FIG. 3B is slightly different than the arrangement shown in FIG. 2 for the purpose of simplifying the discussion for the convenience of the reader. Specifically, each signal of signals $P_1$ through $P_3$ is shown to be processed individually in FIG. 3B. However, in FIG. 2, a "head-to-toe" arrangement is shown in which the higher frequency IF signals of the first stage of the heterodyne conversion originate from nodes between photodetectors 103. The arrangement shown in FIG. 2 is advantageous because it only involves two signal paths from the first stage of the heterodyne conversion. The depicted head-to-toe arrangement of FIG. 2 implements the intensity-noise subtraction. The formation of the quadrature signal from the down-converted representative signals may be performed by, for example, by appropriate digital signal processing associated with processing block 205. By isolating the images, the spectral resolution of the spectral analysis may be improved.

Embodiments in accordance with the invention enable the amplitude and relative phase of the heterodyne signal to be determined. As a result, the amplitude-repeatability of the spectral analysis is appreciably improved, because the amplitude measurement is not dependent upon the relative phase of the signal being measured and the optical local oscillator signal. Moreover, the optical frequency image resulting from bandpass filtering may be rejected due to the phase diversity characteristic. Furthermore, embodiments in accordance with the invention enable operation at frequencies where the intensity noise is appreciably lower. Therefore, the requirements on the intensity-noise subtraction are appreciably relaxed. Thereby, the balancing of the frequency responses on the photodetectors are eased.

Although embodiments in accordance with the invention and its advantages have been described in detail, it should be understood that various changes, substitutions and alterations can be made herein without departing from the spirit and scope of embodiments in accordance with the invention as defined by the appended claims. Moreover, the scope of the present application is not intended to be limited to the particular embodiments in accordance with the invention described in the specification. As one skilled in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for determining a spectral content of an optical signal, comprising:

an optical hybrid for combining said optical signal and an optical local oscillator signal to generate phase-diverse components;

a plurality of photodetectors with each photodetector illuminated by a respective one of said phase-diverse components thereby mixing said optical signal and said optical local oscillator;

a plurality of bandpass filters for bandpass filtering signals from said plurality of photodetectors, wherein said bandpass filters generate filtered signals to coincide with a low-intensity noise region of said optical signal;

a plurality of mixers for mixing said filtered signals from said plurality of bandpass filters with an electrical local oscillator signal; and a signal processing module that determines said spectral content utilizing signals from said plurality of mixers;

wherein said photodetectors are coupled in a serial arrangement and each of said bandpass filters is coupled to a respective node between two respective photodetectors of said plurality of photodetectors.

2. The system of claim 1 wherein said signal processing module separates negative images from positive images and that determines said spectral content from one or both of said negative images and said positive images.

3. The system of claim 1 wherein separation of negative images from positive images is performed by a digital signal processor.

4. The system of claim 1 further comprising:
a laser source for generating said optical local oscillator signal.

5. The system of claim 4 wherein said laser source sweeps said optical local oscillator across a predetermined spectrum.

6. The system of claim 1 further comprising:
a plurality of amplifiers for amplifying said signals from said plurality of photodetectors before said plurality of mixers are operable.

7. The system of claim 1 wherein said plurality of photodetectors are photodiodes.

8. The system of claim 1 wherein said optical hybrid is an N×N optical coupler, wherein N>2.

9. The system of claim 1 wherein said optical hybrid is a network of optical couplers.

10. The system of claim 1 wherein said optical hybrid includes free space optical elements.

11. A method for determining a spectral content of an optical signal, comprising:
providing said optical signal as a first input, an optical local oscillator signal as a second input, and a third input to an optical hybrid to generate phase-diverse components;
photodetecting said phase-diverse components using at least three photodiodes thereby mixing said optical signal with said local oscillator;
bandpass filtering signals from said photodetecting to generate filtered signals that correspond to a low intensity noise region of said optical signal;
mixing said filtered signals with an electrical local oscillator signal; and
determining a spectral content of said optical signal utilizing signals from said mixing.

12. The method of claim 11, wherein said determining comprises:

generating a quadrature signal representation from signals from said mixing; and
separating a negative image and a positive image from said quadrature signal representation.

13. The method of claim 11 further comprising:
amplifying signals from said photodetecting before performing said mixing.

14. The method of claim 11 wherein said plurality of photodiodes are coupled in a serial arrangement and said bandpass filtering filters signals that are each received from nodes between two respective photodiodes of said plurality of photodiodes.

15. The method of claim 11 wherein said optical hybrid is an N×N optical coupler where N>2.

16. A system for determining a spectral content of an optical signal, comprising:
optical hybrid means for coupling said optical signal and an optical local oscillator signal to generate phase-diverse components;
at least three photodetector means with each photodetector means of photodetector means with each photodetector means illuminated by a respective one of said phase-diverse components thereby mixing said optical signal with said optical local oscillator signal;
a plurality of filtering means for bandpass filtering signals from said plurality of photodetector means to generate filtered signals that coincide with a minimal intensity noise region of said optical signal;
a plurality of mixer means for mixing said filtered signals with an electrical local oscillator signal; and
a signal processing means for determining said spectral content utilizing signals from said plurality of mixer means.

17. The system of claim 16 wherein said signal processing means is operable to generate a quadrature representation of a phase-diverse heterodyne signal.

18. The system of claim 17 wherein said signal processing means is operable to separate positive images from negative images that are associated with said phase-diverse heterodyne signal to determine said spectral content.

* * * * *

UNITED STATES PATENT AND TRADEMARK OFFICE
CERTIFICATE OF CORRECTION

PATENT NO.         : 7,265,849 B2                                          Page 1 of 1
APPLICATION NO.    : 10/670538
DATED              : September 4, 2007
INVENTOR(S)        : Gurunathan et al.

It is certified that error appears in the above-identified patent and that said Letters Patent is hereby corrected as shown below:

On the Title Page Item –56– under "Other Publications", line 7, delete "Opitcal" and insert -- Optical --, therefor.

In column 8, lines 23-24, in Claim 16, after "for means" delete "of photodetector means with each photodetector means".

Signed and Sealed this

Thirteenth Day of May, 2008

JON W. DUDAS
*Director of the United States Patent and Trademark Office*